Oct. 20, 1959  B. GRAHAM  2,909,456

NON-WOVEN SHEET MATERIAL

Filed July 27, 1955

INVENTOR
BOYNTON GRAHAM

BY
ATTORNEY

United States Patent Office 2,909,456
Patented Oct. 20, 1959

2,909,456

NON-WOVEN SHEET MATERIAL

Boynton Graham, Wilmington, Del., assignor to E. I. du Pont de Nemours and Company, Wilmington, Del., a corporation of Delaware Application July 27, 1955, Serial No. 524,773

7 Claims. (Cl. 154—124)

This invention relates to leather replacement materials, and more particularly to non-woven sheet materials having a suede-like appearance.

Leather replacement materials have had a long history dating from the days of pyroxylin-coated, fibrous materials to the vinyl-coated, woven fabrics available today. Recently, leather replacement materials have been developed which are not only cheaper than genuine leather and prior art synthetic leathers but can be tailored to various end uses by controlling their processes of manufacture. These materials comprise matted, structural fibers bound together by a polymeric binder. They are generally prepared in three steps:

(1) A non-woven mat of interlaced fibers is formed from staple fibers by suitable means such as techniques used in wool carding or paper making.

(2) The mat is impregnated with a thermoplastic binder polymer so that each individual fiber is completely surrounded by the binder.

(3) The impregnated mat is pressed, usually at an elevated temperature, to form a consolidated or integrated sheet structure.

The properties of these materials, i.e., flexibility, tear strength, softness, etc., are superior to the coated fabrics and compare favorably with genuine leather. Permeability to water vapor may be controlled by the degree of consolidation in the third step or by adding a fourth step which involves a chemical or physical treatment of the consolidated structure. However, until now no satisfactory process has been developed to prepare specialty products such as suede from these leather replacement materials while retaining the improved properties and lowered cost of the materials.

It is an object of this invention to provide a new sheet material of the type in which matted, structural fibers are held together by an extensible, polymeric binder. Another object is to provide such a material having a suede-like appearance. A further object is to provide a suede-like leather replacement composition having softness, high tear strength, high tenacity, and, if desired, vapor-permeability. A still further object is to provide a process for preparing such materials. Other objects will appear hereinafter.

The above objects are accomplished by using fibers having an average length of about 0.01 inch in the surface layer of a sheet material composed of a non-woven mat of structural fibers and an extensible polymeric binder. Preferably, the structure comprises a sheet material of 30% to 70% non-woven matted structural fibers and 70% to 30% of an extensible polymeric binder binding the fibers together, the sheet having a surface layer of fibers of an average length of about 0.01 inch, and in the case of the permeable sheet, the sheet also having channels substantially contiguous with a major portion of the fibers throughout the thickness of the sheet.

The process for preparing the sheet material comprises plying a plurality of non-woven mats of fibers, the fibers of the non-woven mat in the surface layer having an average length of about 0.01 inch; impregnating the mats with an extensible polymeric binder; pressing the impregnated mats to form a compacted structure; abrading the sheet to bring the fibers in the surface layer of the compacted structure to the surface; and to form a vapor-permeable, suede-like sheet material, breaking a substantial portion of the fibers away from the binder to form channels substantially contiguous with a major portion of the fibers. Preferably, when forming the vapor-permeable, suede-like material, the contiguous channels are formed prior to the abrading step.

The term "contiguous channels" as applied to the preferred type of vapor-permeable sheet material, refers to channels or pores adjacent to portions of fibers throughout the structure. The channels are not necessarily completely annular. In some cases, the channel may spiral around part of the length of the fiber or may take the form of a "hairline crack" substantially parallel to or immediately adjacent to the fiber. They are formed by breaking away fibers from the binder, particularly at points where fibers cross or otherwise contact each other.

Three processes for forming contiguous channels are described in more detail in three copending applications. In U.S. Serial No. 318,732, filed November 4, 1952, now U.S. Patent 2,757,100, to V. L. Simril, a process is described wherein relatively non-extensible structural fibers are used with a relatively extensible binder. Stretching the structure in one or two directions results in contiguous channels. In U.S. Serial No. 325,689, filed December 12, 1952, to J. C. Richards, now abandoned, contiguous channels are formed by first swelling the fibers followed by deswelling (or shrinking) to break the fibers away from the binder. In U.S. Patent No. 2,782,868, filed May 18, 1954, to H. R. Mighton, the previous alternative methods are combined into a single method for forming contiguous channels.

Other methods for imparting vapor-permeability to these sheet materials include that disclosed in U.S. Patent 2,715,588, filed December 16, 1952, and that disclosed in U.S. Patent 2,773,286, filed July 29, 1952, both filed to B. Graham and J. Piccard. In the former, a permeable leather-like product is prepared by mixing fibers of a synthetic linear condensation polymer with a chemically dissimilar polymeric binder and subsequently partially consolidating the mixture under controlled conditions of temperature and pressure. In the latter, structural fibers, pore-forming fibers, and a soft, elastomeric, polymeric binder material having a flow temperature below the deformation temperature of the structural and pore-forming fibers, are hot-pressed to form a compacted impermeable fibrous sheet. The pore-forming fibers are then extracted from the sheet with a liquid which is a solvent for the pore-forming fibers and a non-solvent for said structural fibers and binder material to impart permeability. Although these latter methods are satisfactory, methods involving the formation of contiguous channels are preferred.

Figure 1:
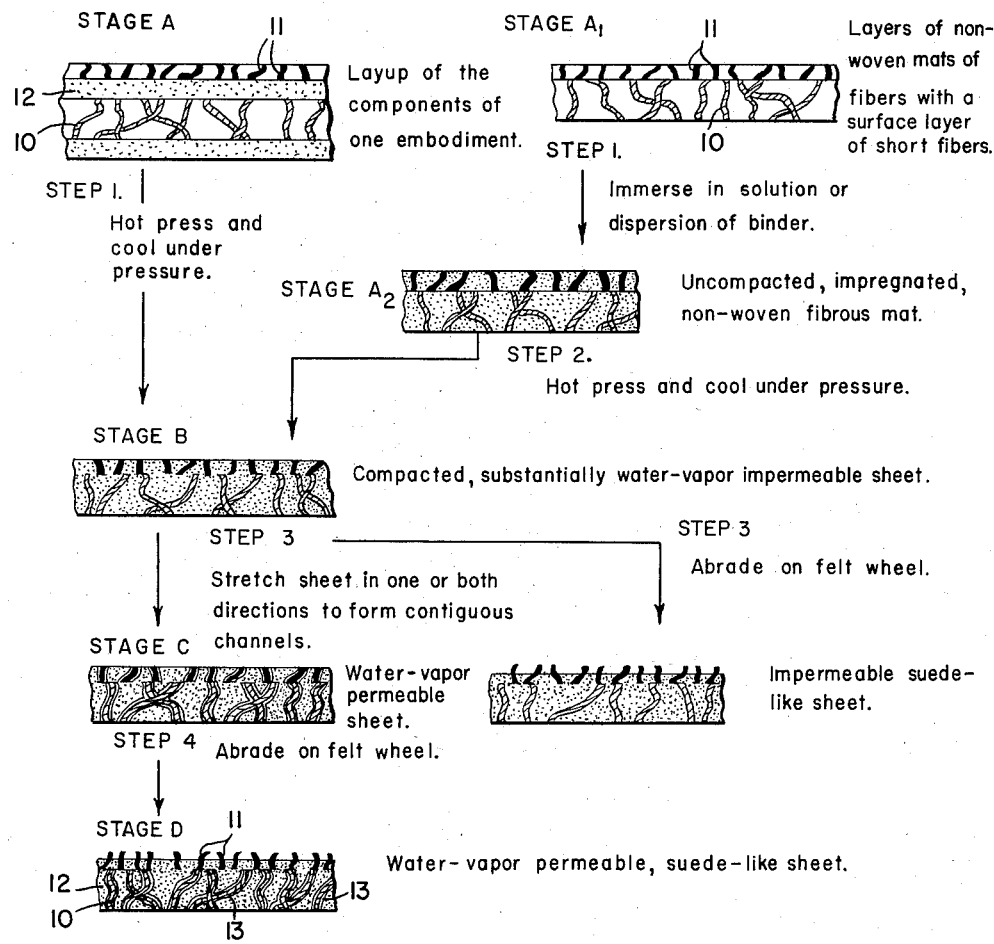
Figure 1 is a flow diagram of representative processes for preparing the sheet materials.
Figure 2:
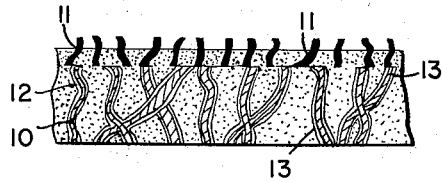
Figure 2 is an enlarged cross section of the final water vapor-permeable sheet material.

Stage A in Figure 1 represents a "layup" or composite of the essential components of one embodiment of the sheet material. About four layers of non-woven mats of nylon fibers, 10, of lengths averaging greater than 0.01 inch are placed in "cross-grain" fashion, one over the other so that the "grain" of each mat is substantially perpendicular to the "grain" of adjacent mats. A non-woven mat of polyethylene terephthalate fibers, 11, averaging about 0.01 inch in length, is placed over the nylon fibrous mats. Non-woven mats can be prepared by the techniques known to paper making or wool carding or they may be prepared by deposition from an air stream on a screen. Homogeneous films or sheets, 12, of polymerized 2-chlorobutadiene-1,3, the binder polymer, are placed between each layer of mats.

In the first step, the composite as illustrated in stage A is placed between two layers of non-heat-sealing cellophane (not shown) and hot pressed at a temperature sufficient to cause the binder polymer, 12, to flow but not sufficient to fuse or transpose the nylon or polyethylene terephthalate fibers, 10 and 11, to any appreciable extent. The resulting compacted structure, as represented by stage B, is a binder polymer sheet reinforced with nylon structural fibers having short polyethylene terephthalate fibers in the surface layer.

Stage B may also be reached by the alternative procedure shown in stages $A_1$ and $A_2$. Stage $A_1$ represents layers of non-woven mats of nylon fibers, 10, and a top layer of polyethylene terephthalate fibers, 11, plied in cross-grain fashion as previously described. In the first step the mats are impregnated with the binder polymer by immersing them in a solution of polymerized 2-chlorobutadiene-1,3 in a volatile solvent such as toluene, and solidifying the polymer. Alternatively, the mats of stage $A_1$ may be conducted through a dispersion of the binder polymer in a non-solvent medium. Stage $A_2$ represents the uncompacted, impregnated, non-woven fibrous mat. In the next step, the second step, the composite undergoes the hot-pressing treatment previously described to form stage B, the compacted structure of a binder polymer sheet reinforced with nylon structural fibers and having short polyethylene terephthalate fibers in the surface layer.

In the next step, step 3, a substantial portion of the nylon and polyethylene terephthalate fibers are broken away from the binder to form contiguous channels along a major portion of a substantial number of the fibers. Specifically, the sheet shown in stage B is stretched from 10% to 50% in one or two directions. The structural fibers, being less extensible compared to the relatively extensible binder polymer, break away from the binder polymer leaving the contiguous channels. As an alternative procedure the sheet may be dipped in water at a temperature above the softening temperature of the binder to swell the fibers. By then drying the sheet at a temperature below the softening temperature of the binder, the fibers shrink and tend to break away from the binder leaving the contiguous channels. These two alternative methods for forming contiguous channels may also be combined in a single method for the most effective results, i.e., stretching, followed by swelling-deswelling. In any case the resulting sheet shown in stage C is formed. The sheet is composed of non-woven nylon fibers, 10, throughout a polymeric binder, 12, with short polyethylene terephthalate fibers, 11, in the surface layer of the sheet. The interconnecting channels, 13, contiguous with the fibers provide water vapor-permeability in the sheet material yet do not destroy its liquid repellency.

Step 4 is the final step in the process and constitutes subjecting the now permeable composite sheet to abrading action. Abrading may be carried out on any conventional abrading apparatus. One such instrument is composed of two wheels; one, a non-rotatable wheel, 6 inches in diameter and 1 inch wide; a second, a 4 inch diameter, 1 inch thick felt disk mounted so as to rotate about an off-center axis. The smaller wheel, is so arranged that at its maximum displacement, it abrades strongly against the larger non-rotatable wheel. The sample to be abraded is placed on the periphery of the non-rotatable wheel. A single rotation of the off-center wheel is referred to as an abrasion.

Stage D illustrates the permeable suede-like composite sheet of the present invention. This fiber-reinforced sheet is characterized by a surface of short structural polyethylene terephthalate fibers which have been brought up to the surface by means of the abrading action and which impart to the composite sheet the suede-like appearance.

If an impermeable sheet having a suede-like appearance is desired, then step 3 may be eliminated. Step 4 above, the abrading step, then follows step 2 to bring the short polyethylene terephthalate fibers to the surface to produce the suede-like appearance.

The suede-like leather replacement sheets may range in thickness from 15 mils to 50 mils with the surface stratum varying anywhere from 5% to 35% of the total thickness of the sheet. The short surface fibers comprise about 5% to 25% of the total weight of fibers used in preparing the sheets.

Other specific embodiments of the invention are illustrated in the examples which follow. In these examples all percentages are by weight unless otherwise stated. The tests are conventional with the possible exception of the leather permeability measurement and the air porosity test.

(1) *Leather permeability measurement.*—This test was carried out substantially as described by Kanagy and Vickers in Journal of American Leather Chemists Association 45, 211–242 (April 19, 1950). Briefly, a 3 inch diameter crystallizing dish was filled with 12 mesh calcium chloride and covered with a membrane of the substance under test. The dish was inverted and suspended in an atmosphere of 90% relative humidity and a temperature of 23° C. and weighed at intervals. The increase in weight was a measure of the moisture vapor-permeability of the substance under test.

(2) *Air porosity test (Gurley densometer test).*—This test is described in ASTM Standards 1946, Part IIIB, page 1242 as ASTM D726–48. It was measured by timing the flow of 400 cubic centimeters of air through one square inch of the material to be measured. The material was held between two circular orifices which were coaxially clamped. Air was supplied uniformly from a cylinder of accurate diameter and standardized weight floating within a second cylinder partly filled with oil to act as an air seal.

Example 1

Nylon (polyhexamethylene adipamide) staple fibers, averaging about 0.01 inch long, were prepared by compacting 3 denier/filament staple fibers in a ball mill and then passing them through an Abbé[1] cutter. The cut

[1] Made by Abbé Engineering Co.

fibers were mixed in a Waring blender for 15 minutes and transferred to a mixing vessel of distilled water. Small amounts of dioctyl sodium sulfosuccinate and a sodium salt of an alkyl benzene sulfonate were added for wetting and anti-foam purposes and the mixture stirred until the short fibers were completely suspended. A 20 mesh screen attached to a metal ring was lowered into the vessel. The screen was lifted slowly from the vessel to entrap the short nylon fibers thereon. The fibers were then compacted to form a mat, 6 inches long by 6 inches wide. While the mat was still damp on the screen, a second 6" x 6" mat of nylon fibers, the fibers averaging about 2½ inches long and 3 denier/filament was pressed over the mat of short fibers. The 2-layer mat was lifted from the screen and pressed over 3 additional carded mats of 2½ inches long, 3 denier/filament nylon fibers. The mats were plied in cross-grain fashion to form a composite structure. The short fibers constituted 18% of the total fiber weight.

The composite was wet in a solution containing 2% dioctyl sodium sulfosuccinate and 2% of a sodium salt of an alkyl benzene sulfonate. The structure was squeezed through a two-roll wringer and permitted to dry. The structure was then impregnated with about 40% by weight of plasticized neoprene (polymerized 2-chlorobutadiene-1,3), the binder, by immersing in the following dispersion:

1000 parts of a dispersion containing about 50% neoprene
70 parts of a neoprene vulcanizing dispersion
150 parts of a mixture of an oil-soluble high molecular weight sulfonic acid with a paraffin oil
20 parts of a saturated solution of sodium silicate After immersion, the composite structure was allowed to drain and again squeezed through the two-roll wringer. The neoprene binder was then gelled by immersing the structure in a solution of 50% acetic acid in methanol. Acid and salt were removed by washing for 2 hours with water.

The structure was dried at a temperature below 95° C. to prevent curing of the neoprene binder. Thereafter, the structure was cured in a Carver press by pressing at 500 to 1000 pounds per square inch and 135° C. for 15 minutes. The pressure was maintained for 10 minutes while the press cooled below 90° C. Each edge of the structure was pressed for another minute and finally the entire structure received another minute of pressing.

To impart vapor-permeability, the structure was stretched 40% in the longitudinal and transverse directions in accordance with the process described in U.S. Patent 2,757,100, to V. L. Simril. The vapor-permeable structure was then subjected to the abrading action of the felt wheel abrading apparatus described on pages 8 and 9. The structure displayed a suede-like appearance after 100 abrasions.

The final sheet was 0.045 inch thick; had a unit weight of 961 grams/square meter; a tenacity of 2682 pounds/square inch; a tear strength of 37.4 pounds; a tensile modulus of 1958 pounds/square inch; a percent elongation of 122%; and a leather permeability value of 2000 grams/100 square meters/hour.

*Example 2*

In a similar manner to that described for Example 1, nylon fibers averaging about 0.01 inch long and 3 denier/filament were formed into a 6″ x 6″ mat and placed and pressed upon three 6″ x 6″ cross-lapped carded webs of nylon fibers 2½ inches long and 3 denier/filament. The short fibers constituted 18.8% of the total fiber weight. The composite was subjected as in Example 1 to the action of a solution containing a wetting and anti-foaming agent, wrung out, dried and impregnated with 33% by weight of a neoprene binder. The impregnating dispersion was identical to that used in Example 1 except that brown pigment dispersion was added in the ratio of 706 parts of the pigment dispersion to 1060 parts impregnating dispersion.

After impregnation, the composite was cured under pressure (500 to 1,000 pounds/square inch) for 15 minutes in the Carver press. The pressure was maintained for 10 minutes while the press was cooling to 90° C.; each edge of the sample was then pressed for 1 minute; and finally the entire structure pressed for 1 minute. The cured composition was then divided into 2 parts. One was stretched 30% in two directions; the other, 45%. As in Example 1, the cured and stretched composites were subjected to abrading action on a felt wheel to provide the suede-like appearance characteristic of the process of the invention after 100 abrasions. The structures displayed the following properties:

| Stretched | Thickness (inches) | Unit Weight (g./sq. meter) | L-P Value (g./100 sq. meters/hr.) | Air Porosity (seconds) |
|---|---|---|---|---|
| 30% x 30% | .029 | 566 | 5,228 | 42 |
| 45% x 45% | .037 | 523 | 10,438 | 4 |

*Example 3*

A floc of short staple polyethylene terephthalate fibers averaging about 0.01 inch long and 3 denier/filament was formed in a manner described in Example 1. The short fibers were formed into a 6″ x 6″ mat. The mat was placed and pressed upon three cross-lapped carded 6″ x 6″ mats of nylon fibers, 2½ inches long and 3 denier/filament. The short fibers constituted 15.5% of the total fiber weight. The composite was placed in a bath containing wetting and anti-foam agents, wrung out, dried, and impregnated with 46.5% of the neoprene binder from the impregnating dispersion used in Example 1. The impregnated lay-up was cured in the manner described in Example 1 and the cured sheet was divided into three samples. These samples were stretched 30%, 40% and 45% in two directions and then abraded on a felt wheel. All the samples had a suede-like appearance after 100 abrasions and displayed the following properties:

| Stretched | L-P Value (g./100 sq. meters/hr.) | Air Porosity (seconds) |
|---|---|---|
| 30% x 30% | 2,607 | 206 |
| 40% x 40% | 2,799 | 172 |
| 45% x 45% | 3,144 | 76 |

*Example 4*

Short staple polyethylene terephthalate fibers, averaging about 0.01 inch long and 3 denier/filament was formed into a 6″ x 6″ mat in accordance with the description given in Example 1. The mat was plied with 3 cross-lapped carded 6″ x 6″ webs of nylon fibers, 2½ inches long and 3 denier/filament. As in the previous examples, the composite structure was treated in a bath containing wetting and anti-foam agents, wrung out and dried. It was then impregnated with 36.5% of a neoprene binder by using the standard impregnating dispersion described in Example 1 with added primal extra color in a ratio of 706 parts of the color dispersion containing 50% pigment to 1060 parts of the impregnating dispersion. The impregnated composite was cured in the manner described in Examples 1 to 3 and divided into two samples. The two samples were elongated 30% and 45% in two directions and then subjected to the abrading action on a felt wheel. The samples had a suede-like appearance after 100 abrasions and displayed the following properties:

| Stretched | Thickness (inches) | Unit Weight (g./sq. meter) | L-P Value (g./100 sq. meters/hr.) | Air Porosity (seconds) |
|---|---|---|---|---|
| 30% x 30% | .029 | 582 | 5,797 | 50 |
| 45% x 45% | .031 | 560 | 7,130 | 16 |

It is understood that the preceding examples are merely illustrative of specific preferred embodiments. The invention broadly resides in using short fibers of the order of 0.01 inch long in the surface layer of a sheet material composed of matted structural fibers bound together by an extensible polymeric binder to provide a suede-like leather replacement material.

Most fibers of synthetic and natural origin may be used in this invention. The same fibers may be used throughout the structure with short fibers being limited to the surface layer. An alternative structure is suggested by some of the examples wherein not only the length but the type of fibers used for the surface layer are different from those used throughout the remaining portion of the structure. Mixtures or blends of fibers may also be used for certain purposes. Thus, when a swelling-deswelling treatment is used for imparting permeability, it may be advantageous to use rayon blended with nylon in the structure. Permeability is more easily attained since rayon reacts to a milder swelling-deswelling treatment than does nylon. It may also be advantageous to incorporate pore-forming fibers in the surface of or throughout the structure to enhance permeability. Thus, cellulose acetate fibers which are soluble in acetone may be blended with the mats essential to the invention prior to impregnation with the binder.

The denier of all the fibers and the length of the staple fibers used in the substrata are not critical to the invention. The length may vary from 0.01 inch up to 8 inches or greater and the denier may vary from 1 to 16 denier per filament. The longer fibers, 0.5 to 4 inches long, are preferred in the substrata since they provide improved tensile strength and improved extensibility in the finished sheet material. The heavier deniers are also preferred since they make the sheet material tougher and more durable.

The desired depth of the surface layer or layers, which is the depth of the short fibers, may vary from 2% to 33% of the total thickness of the sheet and will depend on the particular end use. For instance, materials used for shoe uppers require a deeper layer than those used as materials for jackets and the like because of the harsher treatment received by shoe uppers in use. In all cases, the depth should be kept to the minimum necessary for the particular use. Otherwise, the structure may be weakened and its leather permeability value reduced. The depth can be determined by experiment and will vary with the fibers used, the binder used and the degree of consolidation achieved during pressing.

The critical factor in selecting the polymeric binder is that it should be chemically different from the structural fibers. A convenient rule is that the binder be incompatible in the melt with the structural fibers. Otherwise, the structures are usually deficient in drape, hand, flex life and tear strength. Furthermore, the binder should flow at a temperature at least 50° below the deformation temperature of the structural fiber and, as a film, exhibit a tensile strength of at least 500 pounds/square inch, an elongation of at least 100% and a tensile modulus no greater than 25,000 pounds/square inch. A binder fulfilling these requirements may be described as tough, pliable and initially thermoplastic.

A number of thermoplastic materials useful as binder materials are classified as elastomers and are disclosed by H. L. Fisher in Industrial and Engineering Chemistry, August 1939, page 942. In the most preferred sheet materials of this invention, the polymeric binder will be a linear addition polymer. Because of their availability and particularly their low cost and desirable polymer properties, the most outstanding are the vinylidene polymers and copolymers including both the monoene and diene types. This class of polymers is characterized by having in each polymerizable monomer as the only polymerizable ethylenic unsaturation, terminal ethylenic groups wherein the terminal carbon is a methylene carbon, i.e., those containing one or more vinylidene ($CH_2=C<$) groups. Specific examples of such polymers include the various vinylidene hydrocarbon polymers such as butadiene/styrene, polyethylene, polyisobutylene, polyisoprene, both synthetic and natural; the various negatively substituted polymers such as the vinylidene halide including vinyl halide polymers, e.g., polyvinylidene chloride, polyvinyl chloride and polyvinyl fluoride; derivatives of such polymers as halogenated vinyl and vinylidene polymers, e.g., chlorinated polyethylene, and chlorinated polyvinyl chloride; the various vinylidene polymers wherein one or both of the indicated free valences of the 2-carbon of the vinylidene group are bonded directly to carboxyl groups or groups hydrolyzable to carboxyl groups either directly to the acyl carbon or to the oxy oxygen thereof, such as polymers of various vinylidene esters, including vinyl acetate and ethylidene diacetate; vinylidene carboxylic acids and their derivatives such as acrylic acid, acrylonitrile, and methacrylamide.

Also included in this most preferred group are the various copolymers of such vinylidene monomers, including specifically the various monoene and diene copolymers of this class such as 2,3-dichlorobutadiene-1,3/2-chlorobutadiene-1,3 copolymers; the various monoene/vinylidene copolymers such as the commercially important vinyl and vinylidene chloride copolymers, e.g., vinyl chloride/vinyl acetate, vinyl chloride/vinylidene chloride, and vinyl chloride/vinyl acetate/acrylonitrile copolymers; the various vinylidene hydrocarbon negatively substituted vinylidene copolymers, e.g., ethylene/vinyl acetate and the hydrolyzed products therefrom; ethylene/vinyl chloride, and butadiene/acrylonitrile copolymers.

In the case of those binder components containing in combined form appreciable proportions of diene monomers, particularly the vinylidene diene monomers, it is frequently desirable to have present in the solution, dispersion, or bulk treating material, whichever is used, suitable amounts of chemical agents for effecting under controlled conditions, after the fiber has been impregnated with the binder and the whole mat suitably compacted, the cross-linking of the diene copolymer component. The agents for effecting such controllable cross-linking are well known in the rubber art. In the case of the diene hydrocarbon polymers and copolymers, the presence of mercaptans and/or sulfur in the diene polymer composition provides cross-linking by disulfide formation. In the case of negatively substituted diene polymers and copolymers such as the 2-chlorobutadiene-1,3 (chloroprene) polymers, the presence of metallic oxides such as zinc or magensium oxides provides cross-linking by removal of halogen.

Various polyesters containing terephthalic acid or derivatives thereof as essential components are also useful as binder polymers, these including polyethylene terephthalate and copolyesters made from ethylene glycol, terephthalic acid and sebacic acid of the general type described and claimed in United States Patents Nos. 2,623,031 and 2,623,033 in the name of M. D. Snyder. Polyamides useful as a binder polymer include N-methoxymethyl polyhexamethylene adipamide and other similar polymers disclosed and claimed in United States Patent No. 2,430,860. Also included among useful binder polymers are the polyvinyl acetals, such as polyvinyl butyral, polyvinyl laural, etc. Included among various elastomeric polymers which may be employed as binders in the present invention are the polyurethanes which are essentially reaction products of (1) an organic polyisocyanate or polyisothiocyanate with (2) a compound obtainable by reacting (a) one or more polyhydric alcohols with (b) one or more polycarboxylic acids (either in the presence or absence of one or more monocarboxylic acids). Specified products of this type are described and claimed in United States Patent No. 2,333,639 to R. E. Christ and W. E. Hanford. Other types of elastomeric polymers which may be used as binders include reaction products of polyalkylene ether glycols and organic diisocyanates.

In many instances, it is desirable to have appreciable proportions of plasticizers for the binder polymers in the binder composition. This is particularly important in the case of the vinylidene resins. Plasticizers provide high pliability and desirable drape in products that might otherwise be too stiff. This is particularly true of the higher molecular weight, negatively substituted vinylidene polymers and copolymers, such as the vinyl chloride/vinylidene chloride and vinyl chloride/vinyl acetate copolymers. Suitable examples of plasticizers include the higher molecular weight mono- or dicarboxylic acid/alcohol or/copolyesters such as glycerol mono-oleate, glycerol sebacate, dioctyl phthalate, and ethylene octanoate; or the lower molecular weight polyesters and polyesters such as the polyalkylene oxides and their esters, e.g., polyethylene oxide, methoxy-polyethylene glycol; and the lower molecular weight condensation polyesters such as polyethyleneglycol adipate.

The binder polymer employed in the surface stratum may be different from the binder in the internal strata of the sheet. This might be desirable to obtain a flexible structure with a hard top layer. To obtain an integral structure, the binder polymer in the top layer must be compatible with and chemically similar to the binder employed in the lower layers of the composite. A typical lay-up might consist of alternate layers of films of polyisobutylene and non-woven fibrous mats with polyethylene in the top layer.

Another method of obtaining a flexible structure with a hard top stratum would be to use the same binder polymer throughout but with different contents of plasticizer in the various strata. For example, the top stratum may be composed of a binder without plasticizer and the lower strata may contain varying amounts of a plasticizer. Such a structure will have a relatively hard surface stratum, but with high flexibility due to the plasticized internal strata.

Color can be imparted to the sheet material of this invention by incorporating dyes or pigments in the polymeric binder or, preferably, by dyeing the structural fibers prior to forming the initial composite with the binder. Another method is to apply a special color coat, about 2 to 4 mils thick, which contains a pigment, a polymeric binder and a plasticizer. The binder may be different from that used in the basic sheet material. A typical color coating may comprise 100 parts of polymeric binder, 70 parts of plasticizer and 40 parts of the pigment. When using a color coat, it may also be desirable to apply a "depth" coat about 0.5 mil thick. The depth coat usually contains binder and plasticizer wherein the plasticizer content is lower than in the color coat and in the remaining structure. A top coating called a "gloss" coat, about .01 to 2 mils thick, may be applied over the color and depth coats. This coating is normally transparent, a typical formulation comprising 100 parts of binder polymer, 33 parts of polymethylmethacrylate, 6.6 parts of silica and 1.4 parts of stearic acid. These three coats may be made permeable if desired by suitable means heretofore known in the art.

The advantage of the product lies in the simulated suede atttainable without sacrificing tear strength, tensile strength, flex life or extensibility. The process is relatively easy to control and can be modified to tailor the product for particular end uses. The process is also easily adapted for continuous operation. Most important, the product is economical to produce and the process requires relatively little time.

The product, vapor-permeable or impermeable, can be substituted in substantially all suede-leather applications: the impermeable material in handbags, book bindings, luggage, brief cases, table covers, etc.; the vapor-permeable material in gloves, shoe uppers, wearing apparel, etc.

As many different embodiments of this invention may be made without departing from the spirit and scope thereof, it is understood that the invention is not limited except as defined in the appended claims.

The invention claimed is:

1. A sheet material comprising a base of matted structural fibers substantially greater than .01 inch in length and an extensible polymeric binder binding said fibers together, said sheet having in the surface layer only fibers averaging about 0.01 inch in length.

2. A sheet material as in claim 1 composed of 30% to 70% structural fibers and 70% to 30% binder.

3. A permeable sheet material comprising a base of matted structural fibers substantially greater than .01 inch in length and an extensible polymeric binder binding said fibers together, said sheet having in the surface layer only fibers averaging about 0.01 inch in length; said sheet also having channels substantially contiguous with a major portion of the fibers throughout the thickness of said sheet.

4. A sheet material as in claim 3 composed of 30% to 70% structural fibers and 70% to 30% binder.

5. A process for preparing sheet material which comprises plying a plurality of non-woven mats of fibers substantially greater than .01 inch in length, superposing over said mats a surface layer of a non-woven mat of fibers averaging about 0.01 inch in length; contacting said mats with an extensible polymeric binder; hot pressing the mats in contact with the binder to form a compacted structure; and abrading the compacted structure.

6. A process for preparing permeable sheet material which comprises plying a plurality of non-woven mats of fibers substantially greater than .01 inch in length, superposing over said mats a surface layer of a non-woven mat of fibers averaging about 0.01 inch in length; contacting said mats with an extensible polymeric binder; hot pressing the mats in contact with the binder to form a compacted structure; breaking a substantial portion of the fibers away from the binder to form channels substantially contiguous with a major portion of the fibers; and abrading the resulting structure.

7. A process for preparing permeable sheet material which comprises plying a plurality of non-woven mats of nylon fibers substantially greater than .01 inch in length, superposing over said mats a surface layer of a non-woven mat of poleythylene terephthalate fibers averaging about 0.01 inch in length; contacting said mats with a neoprene binder; hot pressing the mats in contact with the binder to form a compacted structure; stretching the structure 10% to 50% in at least one direction to form channels substantially contiguous with a major portion of the fibers; and abrading the resulting structure.

References Cited in the file of this patent

UNITED STATES PATENTS

| | | |
|---|---|---|
| 1,427,754 | Gibbons et al. | Aug. 29, 1922 |
| 1,694,258 | Hartong | Dec. 4, 1928 |
| 1,787,680 | Hartong | Jan. 6, 1931 |
| 2,336,797 | Maxwell | Dec. 14, 1943 |
| 2,650,213 | Hofrichter | Aug. 25, 1953 |
| 2,719,806 | Nottebohm | Oct. 4, 1955 |
| 2,725,309 | Rodman | Nov. 29, 1955 |
| 2,757,100 | Simril | July 31, 1956 |

FOREIGN PATENTS

| | | |
|---|---|---|
| 454,001 | Canada | Jan. 11, 1949 |